United States Patent [19]

Baker et al.

[11] Patent Number: 4,824,919

[45] Date of Patent: Apr. 25, 1989

[54] TOUGHENING OF CURED VINYL ESTER RESINS BY INCLUSION IN THE UNCURED RESINS OF OLIGOMERIC VINYL-REACTIVE URETHANES WHICH PHASE OUT UPON CURING

[75] Inventors: Alvin W. Baker, Antioch; Patrick H. Martin, Danville, both of Calif.

[73] Assignee: The Dow Chemcial Company, Midland, Mich.

[21] Appl. No.: 819,669

[22] Filed: Jan. 17, 1986

Related U.S. Application Data

[63] Continuation of Ser. No. 682,633, Dec. 17, 1984, abandoned, which is a continuation-in-part of Ser. No. 502,886, Jun. 9, 1983, abandoned.

[51] Int. Cl.$^4$ .................. C08L 61/14; C08L 63/10
[52] U.S. Cl. .................. 525/502; 525/454; 525/455; 525/528; 525/920
[58] Field of Search ............... 525/528, 454, 502, 920

[56] References Cited

U.S. PATENT DOCUMENTS

| | | | |
|---|---|---|---|
| 4,200,762 | 4/1980 | Schmidle | 560/26 |
| 4,296,215 | 10/1981 | Markiewitz | 525/28 |
| 4,338,242 | 7/1982 | Burton | 523/436 |
| 4,348,427 | 9/1982 | Priola | 427/44 |
| 4,357,219 | 11/1982 | Sattler | 204/159.15 |
| 4,390,662 | 6/1983 | Ando | 525/28 |
| 4,394,496 | 7/1983 | Schrader | 528/98 |
| 4,416,750 | 11/1983 | Murphy | 204/159.19 |
| 4,422,996 | 12/1983 | Navin | 264/255 |

*Primary Examiner*—Patricia Short
*Attorney, Agent, or Firm*—Robert R. Stringham

[57] ABSTRACT

Vinyl ester/styrene mixtures are flexibilized by addition thereto of minor amounts of urethanes which (1) comprise at least one polyglycol moiety and two urethane groups and are terminated by vinyl-reactive end groups, and (2) form a dispersed second phase in the cured mixture. The flexibilized compositions otherwise largely retain the characteristic properties of the unflexibilized mixtures.

28 Claims, No Drawings

TOUGHENING OF CURED VINYL ESTER RESINS BY INCLUSION IN THE UNCURED RESINS OF OLIGOMERIC VINYL-REACTIVE URETHANES WHICH PHASE OUT UPON CURING

CROSS REFERENCE TO RELATED APPLICATIONS

This application is a continuation of application/Ser. No. 682,633, filed Dec. 17, 1984, now abandoned, which is a continuation-in-part of application/Ser. No. 502,886, filed June 9, 1983, now abandoned.

The subject matters of two applications co-filed as of even date with the latter application Ser. No. 502,886 are: Ser. No. 507,869; FLEXIBILIZED, POLYCYCLOALKENYL-TERMINATED, UNSATURATED POLYESTERS AND POLYESTERAMIDES, and Ser. No. 502,870; FLEXIBILIZED UNSATURATED POLYESTERS AND POLYESTERAMIDES, now U.S. Pat. No. 4,524,178.

BACKGROUND OF THE INVENTION

Vinyl ester compositions comprising vinyl esters—such as adducts of methacrylic acid with epoxy resins—and non-resinous vinyl monomers, such as styrene, are well known. The known vinyl ester art includes the disclosures of at least the following patents, incorporated herein by reference, for all purposes which legally may be served thereby: British No. 1,030,760 and U.S. Pat. Nos. 3,066,112; 3,179,623; 3,256,226; 3,301,743; 3,317,465; 3,345,401; 3,373,221; 3,377,406; 3,432,478; 3,548,030; 3,564,074; 3,634,542; 3,637,618; 3,684,617; 4,310,644 and 4,338,242.

Vinyl ester/styrene compositions are marketed under several different trade names by as many different companies (such as "DERAKANES", by the Dow Chemical Company; "EPOCRYL" resins, by Shell Chemical Co., and "CO-REZYNS", by Interplastics Co., for example). This type of resin composition exhibits superior chemical resistance (when cured) and has excellent electrical- and thermal-insulation properties. Strong, lightweight composite structures are readily fabricated from it with glass fibers. However, although these resins generally have relatively high impact strengths, there is room for improvement in this regard. That is, for certain applications—such as corrosion-resistant liners for underground pipes, for example—greater flexibility and "toughness" are essential. Thus, the problem of modifying the resins to meet the latter requirement, while largely retaining their otherwise very adequate properties, has developed.

A substantial improvement is achieved by dissolving a carboxy-terminated, butadiene/acrylonitrile rubber (such as "CTBN"; registered trade name of B. F. Goodrich Co.) in the vinyl ester resin/styrene composition. However, this rubber is quite expensive and the amounts of it which must be added to attain even a 10% elongation are such as to adversely affect certain of the other resin properties (such as viscosity and resistance to gasoline, for example) to an undesirable extent. Consequently, a need for a more suitable flexibilizer for vinyl ester resin systems exists.

U.S. Pat. No. 4,390,662 (Ando et al; June 28, 1983; effective reference date Mar. 25, 1981) teaches toughening of polyester and vinyl ester resins (vinyl esters plus styrene) with unsaturated polyurethanes prepared by reacting 1 molecular proportion of an organic diol with from 0.7 to 1 molecular proportion of a diisocyanate and capping the resulting adduct with 2 molecular proportions of a hydroxyalkylacrylate. The Ando polyurethanes have molecular weights corresponding to "weight-average molecular chain extensions, calculated as polystyrene," of from 100 to 1500 Å, preferably from 200 to 1000 Å, most preferably from 300 to 1000 Å. That is, the rectilinear length of an unstraightened polystyrene molecule having a molecular weight equal to the weight average molecular weight of the polyurethane is from 100 to 1500 Å, etc. A length range of from 100 to 1000 Å corresponds to a moleuular weight range of from about 22,295 to about 2,229,500.

The patent teaches that in order to be an effective toughener, the polyurethane must phase out upon curing of polyester/styrene/urethane compositions but must not phase out upon curing of vinyl ester/styrene urethane compositions.

Thus, the patent teaches away from the use of oligomeric urethanes for toughening of either polyester or vinyl ester resins. It also teaches away from toughening of vinyl ester resins with urethanes which phase out upon curing.

U.S. Pat. No. 4,222,996 (Navin et al, Dec. 27, 1983; effective reference date Jan. 11, 1982) discloses in-mold coating of partially cured, molded, fiber-reinforced, thermosetting plastic articles. The coating composition has a long pot life and consists essentially of a vinyl monomer such as styrene or various acrylates—including epoxy acrylates or vinyl ester resins, and an acrylate terminated polyurethane. The urethane can constitute as much as 83 weight % of the composition and is made by reacting 1 molecular proportion of a hydroxyalkyl acrylate and from 0.15 to 0.5 molecular proportions of an organic diol with an amount of a diisocyanate which provides from 0.9 to 1 isocyanate group per hydroxyl group. Nothing is said in the patent about toughening, elongation or tensile or impact strengths. Neither is there any suggestion of preparing the main body of the article itself from resins of the nature disclosed for coatings. The only teaching from which any inference might be drawn as to phasing behavior in the cured coatings is to the effect that inclusion of an opacifier is an option. (Coating thicknesses greater than 0.004" are not suggested.)

OBJECTS OF THE INVENTION

The primary object of the invention is to provide flexibilized vinyl ester/styrene compositions from which articles largely retentive of the properties of the unflexibilized compositions can be prepared.

A further object is to achieve said flexibilization by addition of a relatively small amount of a readily available, relatively cheap material which is compatible with the uncured resin/styrene composition.

Another object is to achieve said flexibilization without markedly increasing the viscosity of the resin/styrene composition.

A particular object of the invention is to provide such vinyl ester resin/styrene compositions which, when cured, exhibit at least a 15% elongation.

Still other objects will be made apparent to those knowledgeable in the art by the following specifications and claims.

SUMMARY OF THE INVENTION

It has now been discovered that the foregoing objects can more than be attained by addition to the vinyl ester/styrene composition of a compatible, vinyl terminated, urethane oligomer which includes a polyglycol unit and forms a dispersed second phase when the resulting mixture is cured. Similar, but non-oligomeric, urethanes of comparable molecular weights are also believed to be effective flexibilizers for cured vinyl ester/styrene (etc.) compositions.

It is believed that neither coatings or "articles" per se have previously been prepared from vinyl ester resin/vinyl-reactive urethane mixtures which phase separate upon curing. Neither has it been disclosed that small amounts of urethanes exhibiting this phasing behavior (as such or as in situ-formed copolymers with vinyl monomers) are remarkably effective tougheners for vinyl ester resins.

The invention may be more narrowly defined as a curable, shaped article formed from a material consisting essentially of a homogeneous mixture of a vinyl ester with a toughness-imparting, oligomeric urethane and from about 4.5 to about 60 parts by weight of a non-resinous vinyl monomer per 40 parts total of said ester and urethane, the ester to urethane ratio by weight in said mixture being from about 97/3 to about 60/40 and said urethane being one which:
(a) contains at least one polyetherglycol moiety,
(b) contains at least two urethane groups,
(c) has two vinyl-reactive end groups, and
(d) forms a dispersed second phase when said article is cured.

Preferably, the article is cured (and thereby comprises a second phase which has formed during the curing operation).

In a process aspect, the present invention is the method of producing a toughened, rigid article which comprises shaping a curable body of a resinous material in which the resinous component consists essentially of a mixture of a vinyl ester, a non-resinous vinyl monomer and an oligomeric urethane which:
a. contains at least one polyetherglycol moiety, two urethane groups and two vinyl-reactive end groups, and
b. will form a dispersed second phase when the shaped body is cured.

As used herein, the term "homogeneous" is not limited to solutions but applies also to dispersions which either are stable or revert but slowly to separate layers. However, the term "compatible" is limited to components which form true solutions with each other.

Whenever reference is made herein to "a" or "an" ester, vinyl monomer or urethane component, it is to be understood that, unless specifically indicated to the contrary, mixtures of individual esters, monomers or urethanes may be used and not just single molecular species thereof.

The term "article" as used herein includes, in its broadest sense, toughened vinyl ester resin coatings. Preferred articles, however, are those which consist entirely of or have a main body consisting of the material specified earlier herein.

DETAILED DESCRIPTION

Vinyl Esters

Vinyl esters suitable for the practice of the present invention include those disclosed in the aforereferenced patents. These esters are generally preparable by the adduction of an at least difunctional epoxide with at least two molecules of an unsaturated monocarboxylic acid in which the carbon to carbon double bond is vinyl reactive.

Exemplary of suitable epoxy resins are the well known polyglicidyl ethers of polyphenylol alkanes and the "advanced" resins (higher polymers) formed by the reaction of polyphenols—such as bisphenol A, for example—with polyglycidyl ethers—such as the diglycidyl ether of bisphenol A, for example. Epoxy novolacs are also suitable, as are cycloaliphatic diepoxides.

The glycidyl ethers of polyphenols, such as lower alkanes (or alkenes) substituted with three or four hydroxyphenyl groups, for example, are of particular interest for the preparation of vinyl esters suitable for the practice of the present invention. Most notable among such epoxides are the triglycidyl ethers of tri(hydroxyphenyl)methanes, ethanes and propanes and the tetraglycidyl ethers of tetra(hydroxyphenyl)ethanes and propanes.

Example 7 herein is specific to the 3:1 adduct of methacrylic acid with tris(4-glycidyloxyphenyl)methane.

Suitable epoxides having functionalities higher than four are exemplified by the oligomeric reaction products of tri(hydroxyphenyl)methanes with epichlorohydrin, which may comprise as many as seven glycidylether groups. Similarly, phenol/formaldehyde or bisphenol/formaldehyde novolacs containing five or more hydroxyphenyl groups are well known as the corresponding polyglycidyl ethers.

Exemplary of suitable acids are the ethylenically unsaturated monoacids such as—for example—acrylic, methacrylic, crotonic and cinnamic acids. Also suitable are half-esters derived from unsaturated dicarboxylic acids and/or unsaturated alcohols—such as hydroxyalkyl acrylates, for example. Preferably, the acid is one in which the reactive vinyl group is a terminal group. Another class of suitable acids are bicycloalkenyl acids, such as—for example—5-norbornene-2-carboxylic acid.

The vinyl ester is prepared by reacting the polyepoxide and the acid in about stoichiometric amounts, generally with heating and in the presence of a catalyst, such as a trivalent chromium salt, as for example, CrCl$_3$ or a phosphine, alkali, onium salt or a tertiary amine—as for example, tris(N,N-dimethylaminomethyl phenol). Often, the ester will be formed in the presence of a vinyl monomer such as styrene and the resulting mixture will constitute what is meant by the term "vinyl ester resin".

A substantial number of different vinyl esters having distinct characteristics may be prepared by reacting different epoxides (or mixtures thereof) with various unsaturated acids (or mixtures thereof). Similarly, the properties of the ester/vinyl monomer mixture may be varied by selecting various such monomers (or mixtures thereof).

Non-resinous, Vinyl Monomers

The non-resinous, vinyl monomers ("diluents", commonly) believed suitable for the practice of the present invention include butadiene, isoprene, 1,4-pentadiene, 1,6-hexadiene, styrene*, α-methylstyrene*, methylstyrene*, ethylstyrene, chlorostyrene, iodostyrene, bromostyrene, fluorostyrene, cyanostyrene, nitrostyrene, divinylbenzene*, acrylic acid, methacrylic acid, methyl acrylate, 2-hydroxyethyl acrylate, 2-hydroxyethyl methacrylate, allyl acrylate, triallylcyanurate, methyl methacrylate, methacrylic anhydride, acrylic anhydride, acrylonitrile*, methacrylonitrile, N,N-dimethyl acrylamide, vinyl acetate, vinyl formate, vinyl acrylate, vinyl methacrylate, vinyl methoxyacetate, vinyl benzoate, vinyl iodide, vinyl chloride, vinyl bromide, vinyl fluoride, vinylidene chloride, vinylidene bromide, vinyl methyl ether, vinyl ethyl ether, vinyl propyl ether, vinyl-2-ethyl hexyl ether, vinyl methyl ketone, vinyl ethyl ketone, N-vinyl pyrrolidone, divinyl sulfide, dimethyl fumarate, dimethyl maleate, crotonic acid, itaconic acid, t-butyl aminoethyl methacrylate, dimethyl aminoethyl methacrylate, glycidyl acrylate, allyl alcohol and other analogous compounds.

The monomers among the foregoing marked with an asterisk are preferred; those monomers—such as vinyl acetate or vinyl chloride—which are known to be slow-curing or which tend to form rubbery polymers—will generally be used only in minor amounts, in admixture with monomers which are fast curing and tend to form harder polymers.

Flexibilizer

The flexibilizer component of the compositions of the invention preferably is of a nature such that the uncured mixture of resin, monomer and flexibilizer is a homogeneous liquid at ordinary temperatures. However, phase separation—i.e., formation of a well dispersed second phase comprising at least some of the flexibilizer component, during curing—is considered essential to attaining good flexibilization without undue degradation of other properties (excessive lowering of the heat distortion temperature, for example).

Urethane oligomers having at least one polyetherglycol unit in the molecule and terminated by reactive vinyl groups have been found eminently suitable as the flexibilizer component. In these oligomers, the "urethane" groups may be derivable from the reaction of either isocyanate or isothiocyanate groups with —OH, —SH or >N—H functions. Similarly, the "polyglycol" unit(s) may comprise at least minor proportions of thioether groups; i.e.—the polyglycol unit can be at least partially derivable from alkylene sulfide (as well as alkylene oxide) molecules.

The most preferred urethane oligomers are those derived from one molecular proportion of a polyalkylene glycol, about two molecular proportions of an aromatic diisocyanate and about two molecular proportions of a hydroxyalkyl acrylate or methacrylate. Oligomers of this type may be exemplified by the reaction product of a polypropylene glycol, toluene diisocyanate (mixed 2,4- and 2,6-isomers) and, hydroxypropylacrylate, having the following ideal or statistical formula (I):

alkylene oxide-extended hydroxyalkylacrylates, N-methylol acrylamide, or allyl- or vinyldialkanolamines (etc.) are also considered effective flexibilizers.

Exemplary of the preferred class of oligomers are those derived from the following aromatic diisocyanates:
toluene diisocyanates
1,5-naphthalene diisocyanate
cumene-2,4-diisocyanate
4-methoxy-1,3-phenylene diisocyanate
4-chloro-1,3-phenylene diisocyanate
4-bromo-1,3-phenylene diisocyanate
4-ethoxy-1,3-phenylene diisocyanate
2,4'-diisocyanato diphenyl ether
5,6-dimethyl-1,3-phenylene diisocyanate
2,4-dimethyl-1,3-phenylene diisocyanate
4,4'-diisocyanato diphenyl ether
benzidine diisocyanate
4,6-dimethyl-1,3-phenylene diisocyanate
durene diisocyanate
4,4'-diisocyanato dibenzyl
3,3'-dimethyl-4,4'-diisocyanato diphenyl
2,4-diisocyanatostilbene
3,3'-dimethoxy-4,4'-diisocyanato phenyl methane
3,3'-dimethoxy-4,4'-diisocyanato diphenyl
1,4-anthracene diisocyanate
2,5-fluorene diisocyanate
1,8-naphthalene diisocyanate
2,6-diisocyanato benzfuran
amyl benzene-2,4-diisocyanate
hexyl benzene-2,4-diisocyanate
dodecyl benzene-2,4-diisocyanate
butyl benzene-2,4-diisocyanate
and the diisocyanates derivable from 4,4'-diaminooctafluorobiphenyl or the various isomeric diamino stilbenes.

Other types of urethane oligomers considered suitable are those analogues of the preceding oligomers in which at least some of the urethane moieties are derivable from aliphatic or alicyclic diisocyanates. The best known of the aliphatic compounds are polymethylene diisocyanates—such as hexamethylene diisocyanate, for example. However, diisocyanates derivable from known aliphatic diamines, such as 1,2-diamino-2-methylpropane or from unsaturated diamines such as cis or trans 1,4-diamino-2-butene are other suitable types of aliphatic diisocyanates. Exemplary alicyclic diisocyanates are 1,4-diisocyanatocyclohexane, 1,4-bis-(isocyanatomethyl)cyclohexane, cis-bis(4-

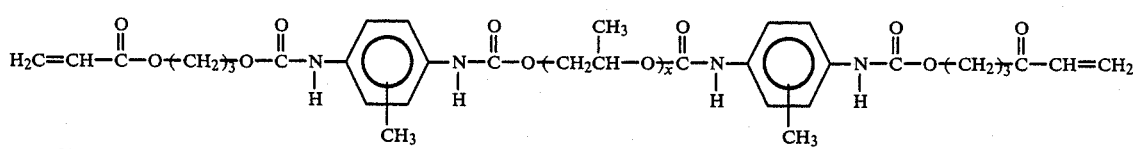

x = ~34.

(A preparation of an oligomer of this type is described in Example 31 of U.S. Pat. No. 3,297,745.)

Also suitable, closely similar oligomers are those nominally having three polyglycol units and four urethane groups; these oligomers are derived from the reaction of three molecular proportions of a polyalkylene glycol, about two molecular proportions of an aromatic diisocyanate and about two molecular proportions of a hydroxyalkyl-acrylate or -methacrylate.

Oligomers, otherwise of either of the latter two types, in which the vinyl-reactive end groups are derived from isocyanatocyclohexyl)methane, isophorone diisocyanate and the diisocyanate derivable from 1,8-diamino-p-menthane.

Also considered suitable are oligomers derivable from heteroaliphatic diisocyanates, such as bis-(2-isocyanatoethyl)ether, for example.

Those knowledgeable in the art will recognize that it is practically impossible to prevent interreaction of intermediate species terminated at one end by an isocyanate group and at the other end by a hydroxyl group, with consequent formation of some oligomers having several polyglycol units and correspondingly more urethane groups (as compared to formula I). This is not disadvantageous; in fact, the presence of a limited proportion of somewhat higher molecular weight oligomers in the flexibilizer may be helpful to the required phasing behavior (in the cured composition). Comparable molecular-weight urethanes of course can be made simply by attaching vinyllic isocyanates to higher molecular weight polyols (which does not result in chain growth). However, it is more convenient to use the more readily available, faster-reacting, lower polyols and, at least to some extent, to chain them together with a small amount of a diisocyanate.

Because the proportion of the diisocyanate in the oligomer molecule is small, the properties of the oligomeric urethane product are not critically dependent on the structure of the diisocyanate. For this reason, the diisocyanate can be of virtually any relatively low molecular weight type which is known or can be derived from known diamines by known synthetic methods.

When the urethane is made by end-capping a polyol (a polyglycol, more precisely) with an unsaturated monoisocyanate, no diisocyanate is used and the molecular weight range of the resulting, non-oligomeric urethane is approximated by that of the starting polyol. Exemplary of suitable such monoisocyanates are isocyanatoethyl methacrylate, vinyl isocyanate, isopropenyl isocyanate, allyl isocyanate and allyl isothiocyanate.

Oligomeric urethanes suitable for the practice of the invention include tetraurethanes produced by reacting an unsaturated monoisocyanate or -isothiocyanate with the terminal hydroxyl groups in a two to one polyglycol/diisocyanate reaction product of sufficient molecular weight so that the tetraurethane will exhibit phasing behavior when included in the cured vinyl ester non-resinous monomer composition. The unsaturated monoisocyanates named in the preceding paragraph are representative of those considered suitable for this purpose.

Suitable polyglycols for the preparation of the (at least di-) urethanes to be employed as flexibilizers include those which will provide at least one unit of the formula (II)

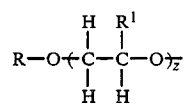

in which $R^1$ is H, methyl or ethyl, $R^2$ is a valence bond, a $C_1$–$C_6$ alkylene, hydroxyalkylene or alkenylene group, phenylene, a cycloalkylene group or the diacyl residue of a saturated or unsaturated dicarboxylic acid; and x and y, independently, are integers of from about 10 to about 50, depending inversely on the number of such units in the molecule. When the molecule includes only one polyglycol unit, the sum of x and y should be high enough to ensure separation of at least some of the flexibilizer as a dispersed second phase in the cured composition.

When the urethane is to be made by end-capping the polyglycol with an unsaturated monoisocyanate, $R^2$ can also be an

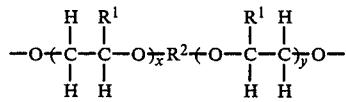

group, in which R is the hydrocarbyl skeleton of a $C_3$–$C_6$ triol (such as glycerine, for example) and z has a value of from 1 to about 50, such that the sum of x, y and z is high enough to ensure at least partial incompatibility of the flexibilizer in the cured composition.

In all units as defined in formula II, $R^1$ can be the same or different, independently, in each occurrence.

Also suitable for urethanes to be made simply by end-capping a preformed polyglycol are "polyglycols" initiated with higher polyols, such as erythritol, arabitol, sorbitol. quercitol and inositol, for example.

The commercial polyglycols are predominantly hydroxy terminated polyalkylene oxides; polyethylene-, propylene- and butylene oxides, most notably. For the practice of the present invention, polypropylene "glycol" is preferred. However, polyglycols comprising at least a substantial proportion of butylene oxide-derived units are considered comparably useful. Typical polyglycols of formula II are those initiated from dihydroxy compounds such as ethylene glycol, glycerol, 2-butene-1,4-diol, bisphenols, dihydroxy cyclohexanes, maleic acid, succinic acid, etc. (at least several versions of which are available as VORANOLS (registered trademark of The Dow Chemical Company)).

Also suitable are "amine-initiated" polyglycols. Representative such polyols are those which will result in the presence in the vinyl-terminated (at least di-) urethane of at least one unit of the following structure (III):

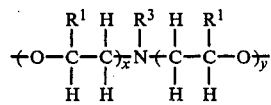

in which x, y and $R^1$ are as defined in formula II and $R^3$ is H, $C_1$–$C_6$ alkyl or alkenyl, phenyl, hydroxyphenyl or

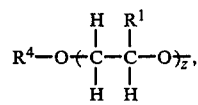

in which $R_4$ is a $C_1$–$C_6$ alkylene or alkenylene group or a phenylene group, z is an integer of from 1 to about 50 and the sum of x, y and z is high enough to insure that at least some of the flexibilizer will phase out in the cured composition.

("Amine-initiated" polyols in which $R^3$ is

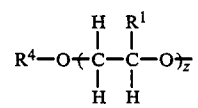

may be prepared from alkylene oxides and tri(hydroxyalkyl)amines—such as, for example, triethanol amine—in the presence of a powdered, anhydrous, inorganic base, such as KOH.)

The use of amino-terminated polyols or of aminoalkyl acrylates in forming the flexibilizer (as—for example—from an unsaturated monoisocyanate or isothiocyanate or from a diisocyanate, respectively) is also contemplated. (This results in urea groups, of course.)

For the purposes of the present invention, the urethane oligomers employed have weight average molecular chain extensions, calculated as polystyrene, of less than 100 Å, preferably less than 65 Å. The latter values correspond, respectively, to weight average molecular weights of less than about 22,000 and preferably less than about 9400. Particularly preferred are those oligomers which have weight average molecular weights of less than about 8000.

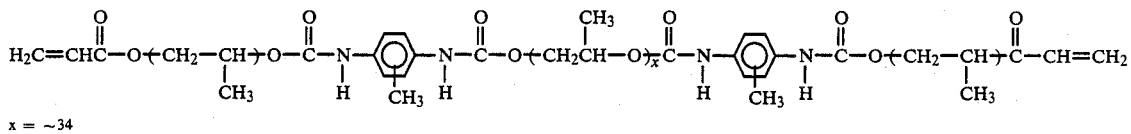

x = ~34

Most preferred among the latter are those oligomers prepared from one molecular proportion of an about 2000 molecular weight polyglycol, about 1.7-2 molecular proportions of a monomeric diisocyanate and about 2 molecular proportions of a hydroxyalkyl acrylate in either of two reaction sequences. That is, the glycol and isocyanate are reacted with each other before the acrylate is introduced or the acrylate and isocyanate are first reacted with each other and the glycol is then introduced (thereby minimizing the molecular weight of the oligomer formed). A typical urethane oligomer made by pre-reacting 2.4 moles of tolylene diisocyanate with 1.2 moles of polypropylene glycol (mol wt. 2000) and then reacting in 2.40 mols of hydroxyethyl acrylate (2/2/1 ratio), was found to have a weight average molecular weight of 7681. When 0.8 mole of the same isocyanate was pre-reacted with 0.8 mols of the same acrylate and then 0.4 mols of the same glycol reacted in, the oligomer obtained had a weight average molecular weight of 5132.

Relative Amounts of Vinyl Ester, Monomer and Urethane

As indicated earlier herein, vinyl monomer-free mixtures of the vinylester and urethane (flexibilizer) in which the ester to urethane weight ratio is from about 97/3 to about 60/40 are suitable for use in the practice of the present invention. In such use, however, these mixtures will include up to about 60 weight % of one or more non-resinous, vinyl monomers; the total content of such monomers ordinarily will be at least 10 weight % and will preferably be from about 40 to about 55 weight percent.

The content of the flexibilizer in the monomer-comprising mixtures can range from about 2.7 to about 20 weight %, but ordinarily will be from about 3 to about 16%. Preferably, the flexibilizer content is within the range of from about 4 to about 11% and the range of from about 5 to about 10% is presently most preferred. The optimum content of course will vary with the specific compositions of the vinyl ester, monomer and flexibilizer and with the ester to monomer ratio, but can be determined for any given case, without undue experimentation, by those skilled in the art.

The flexibilized compositions of course can include substantial amounts of such additives and extenders as are suitable to particular applications and are commonly used with vinyl ester/vinyl monomer compositions.

EXAMPLES

The following examples are for purposes of illustration and the specific embodiments they disclose do not necessarily exhaust the scope of the invention.

Examples A–C are of flexibilizer preparations and are not, per se, examples of the invention itself.

A. Preparation of Flexibilizers from a Polypropylene Glycol, Toluene Diisocyanate and Hydroxypropylacrylate (1) A flexibilizer having the statistical structure (IV) was prepared in two steps; the polyglycol was reacted with TDI (the diisocyanate) in the presence of stannous octoate, until the —OH band in the infrared spectrum of the reaction mixture disappeared and the hydroxyacrylate was then added to react out the remaining isocyanate groups. The detailed procedure follows.

A 0.12% solution of stannous octoate (3.355 grams) in 2811.12 grams (1.4056 g moles) of polypropylene glycol (DOW: P-2000) was added over a period of about 1¾ hours to 488.4 grams (2.8111 g moles) of TDI (DOW; Type I, NACONATE 80; fast-reacting 80/20 mixture of 2,4- and 2,6-isomers) in a 5-liter resin flask fitted with a reflux condenser and stirrer. The flask contents were heated from an initial temperature of 60° C. to a final temperature of 70° C., during the addition. Stirring was continued at the latter temperature for another ¾ hour, at which time the —OH infrared (IR) peak had disappeared. A preformed solution of 1.815 grams of phenothiazine (vinyl polymerization inhibitor) in 330 grams (2.54 g moles) of 2-hydroxypropyl acrylate (HPA) was then added and the resulting mixture stirred at a temperature of 82°–86° C. for an additional ⅜ hour, at which point no further decrease in isocyanate absorption (IR) or increase in carbonyl absorption was observable. The product, designated herein as Flexibilizer A1, had a Gardener viscosity, at 20° C., equivalent to 79,200 cps. (HPA/TDI/P-2000 ratio=1.8/2/1 for this product.)

(2) Preparation of Type A Flexibilizer using 1.7/2/1.15 HPA/TDI/P-2000 Ratio.

The preparation of Example A1 was essentially repeated, except that the mole ratios of the reactants were as above (rather than 1.8/2/1). The Gardener viscosity of the product (Flexibilizer A2) at 20° C. was equivalent to 72,800 cps.

(3) Preparation of a Type A Flexibilizer Having an Ideal Structure Incorporating Two Polyglycol Units and Three Diisocyanate Units.

A mixture of 2473 grams (1.2365 gram moles) of polypropylene glycol (P-2000) and 1 gram of stannous octoate was added with stirring to a mixture of 330 grams (1.897 g moles) of TDI (80/20 mixture of 2,4- and 2,6-isomers) and 0.465 grams of stannous octoate and stirring was continued until the reaction was complete (—OH IR absorption gone). 162.5 Grams (1.25 g moles) of 2-hydroxyethyl acrylate (and a small amount of methyl ethyl hydroquinone vinyl stabilizer) was then stirred into the reaction mixture and allowed to react until the —OH IR absorption was minimized and the urethane carbonyl absorption maximized. A small amount of TDI was added to react out the last of the —OH and then the residual —NCO was reacted out by adding about 0.5–1.0 grams of isopropanol. The resulting product, a very viscous, clear light yellow-colored liquid, was then diluted with styrene to an 80 wt. % resin content solution, designated herein as Flexibilizer A3. The HPA/TDI/P-2000 ratio for this product was 1/1.53/1.

(4) Preparation of Type A Oligomer Using a Lower Molecular Weight Polyglycol.

The preparation of Example A1 was essentially repeated, at the same mole ratios (1.8/2/1) of the reactants, but the polyglycol was P-1200, rather than P-2000. The Gardener viscosity of the product (Oligomer A4) at 20° C. was equivalent to 50,500 cps.

(5) Preparation of Type A Oligomer Using a Higher Molecular Weight Polyglycol.

The preparation of Example A1 was essentially repeated, at the same mole ratios (1.8/2/1) of the reactants, but using P-4000, rather than P-2000, as the polyglycol. The resultant product (Oligomer A5) was quite viscous, although less so than A3.

(6), (7), (8). Three additional type A flexibilizers, of the following compositions, were prepared.

| Flexibilizer | HPA/TDI/P-2000 |
|---|---|
| A6 | 1.6/2/1.2 |
| A7 | 1.75/2/1.17 |
| A8 | 1.8/2/1.1 |

B. Preparation of Non-Oligomeric and Oligomeric Flexibilizers from Isocyanatoethyl Methacrylate (IEM) and a Polyol. (Reactant ratios 2/1 and 2/1/2).

(1) 80.4 Grams (0.52 g mole) of isocyanatoethyl methacrylate, 519.6 grams (0.26 g mole) of P-2000, 0.66 grams of stannous octoate (catalyst) and 0.05 gram of phenothiazine (vinyl stabilizer) were stirred together in a round-bottomed flask for 3 hours. The reaction proceeded, to completion without heating. The resultant, non-oligomeric flexiblizer (B1), exhibited a low viscosity and had the statistical structure V:

(2) A similar but oligomeric flexibilizer was made in two steps, (IEM/TDI/P-2000 mole ratio 2/1/2=1/0.5/1). 25.2 Grams (0.145 g mole) of toluene diisocyanate (Type I NACONATE 80) was added slowly to a solution of 0.69 gram of stannous octoate in 574.8 grams (0.2874 g mole) of P-2000. After stirring for several hours, the resulting glycol-extended diurethane was reacted with 44.5 grams (0.287 g mole) of isocyanatoethyl methacrylate as in (1) above. The resultant flexibilizer (B2) was substantially more viscous than that obtained in preparation B-(1) and had the statistical structure VI:

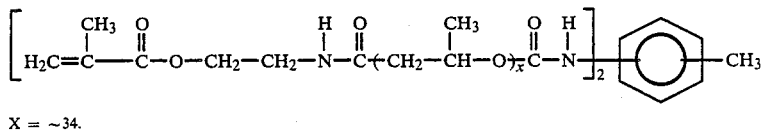

X = ~34.

C. Preparation of a Flexibilizer Comprising Alkylene Oxide-extended Hydroxy-functional Acrylate End Groups Polypropylene glycol (0.06375 mole, 127.5 grams) with an average molecular weight of 2000 and containing dissolved stannous octoate (0.1105 gram) and an organo tin salt commercially available from Witco Chemical Co. as FOMREZ UL-28 (0.1105 gram) was added over a one-minute period to a glass reactor containing stirred toluene diisocyanate (0.1275 mole, 22.21 gram) under a nitrogen atmosphere. The toluene diisocyanate used was an 80 to 20 weight percent mixture of the 2,4- and 2,6-isomers, respectively. A maximum exotherm to 51° C. occurred three minutes later; then the reaction temperature was increased to 60° C. After 44 minutes at the 60° C. reaction temperature, infrared spectrophotometric analysis of a film sample of the transparent reaction product demonstrated that the reaction of the isocyanate with the aliphatic hydroxyl group was complete (disappearance of hydroxyl group, appearance of carbonyl group). The monoether of 2-hydroxyethyl acrylate and pentapropylene glycol(hydroxypropylpropoxypropoxypropoxypropoxyethoxyacrylate; 0.1275 mole, 51.19 grams) was then added. The reaction temperature was maintained at 60° C. and after 78 minutes, infrared spectrophotometric analysis of a film sample of the transparent reaction product demonstrated that the reaction of the remaining isocyanate groups with the aliphatic hydroxyl group was complete. Hydroquinone (100 ppm) was added to the reactor and the resulting oligomer, designated herein as Flexibilizer C, was recovered. (Ratio 2/2/1)

The oligomer had the statistical structure (VII):

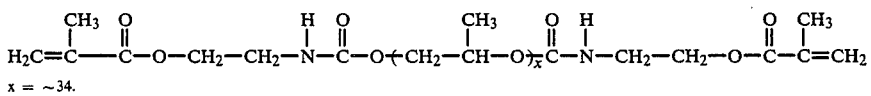

x = ~34.

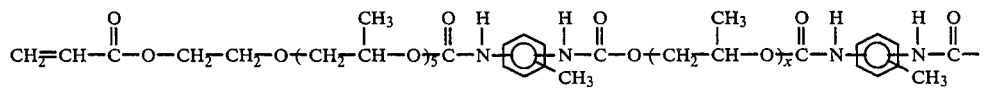

-continued

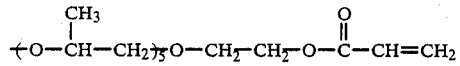

x = ~34.

EXAMPLE 1

Compatibilities of Type A Flexibilizers with Vinylester Styrene Mixtures

Two commercial vinyl ester styrene compositions, sold by The Dow Chemical Company under the registered trade name DERAKANES, were selected for testing. DERAKANE 411-45 is a 45/55 mixture, by weight, of styrene and an adduct of methacrylic acid (and a small proportion of maleic anhydride) with an epoxy resin derived from bisphenol A and the diglycidyl ether of bisphenol A and having an epoxide equivalent weight of about 360. DERAKANE 411-C-45 is essentially the same as the 411-45, except that it does not include any maleic anhydride and, consequently, has a somewhat lower average molecular weight.

Liquid mixtures of several type A flexibilizers with DERAKANES (or DERAKANE components) were examined for compatibility (clarity) at several temperatures. The results are given in Table I following.

TABLE I
RESIN COMPATABILITY STUDIES

| Flexibilizer | HPA/TDI/P-2000 Ratio | Flexibilizer Conc. in 411-C-45 | Temp. | Appearance of Mixture |
|---|---|---|---|---|
| A1 | 1.8/2/1 | 15% | 20° C. | Some Cloudiness |
| A1 | 1.8/2/1 | 15 | 23 | Clear |
| A1 | 1.8/2/1 | 12 | 20 | Clear |
| A2 | 1.7/2/1.15 | 12 | 20 | Cloudy |
| A2 | 1.7/2/1.15 | 12 | 23 | Clear |
| A6 | 1.6/2/1.2 | 7 | 20 | Clear |
| A8 | 1.8/2/1.1 | <3% | 45° C. | Opalescent |
| A8 | 1.8/2/1.1 | 15% in styrene-free vinyl ester | 20 | Clear |
| A8 | 1.8/2/1.1 | 50% in the styrene (no vinyl ester) | 20 | Clear |

It is evident from the Table that 411-C-45/A1 mixtures containing 15 wt. % of the flexibilizer are compatible at 23° C. but exhibit some phase separation at 20° C. At a 12% level, A1 is completely compatible even at 20° C. 411-C-45/A2 mixtures containing 12 wt. % of the stabilizer are compatible at 23° C. but phase separator at 20° C. A6 is compatible, when present in the amount of 7 wt. % at 20° C. A8—the closest to A1 in composition—showed very poor to nil compatibility with 411-45, despite the fact that it was freely compatible with the separate ester and styrene components of 411-45. (This does not imply that homogeneous dispersions of sufficient stability to be useful cannot be made from type A flexibilizers and the 411-45 DERAKANE.)

EXAMPLE 2

The oligomer A5 (prepared, essentially in the manner of Example 1A, from HPA, TDI and a higher molecular weight polyglycol, P-4000) was practically immiscible with DERAKANE 411-C-45, even at very low "concentrations".

This of course does not rule out the suitability of higher molecular weight polyglycols in different types of flexibilizers (type B, for example) or in mixtures comprising different vinyl esters and/or monomers.

EXAMPLE 3

Comparison of DERAKANE 411-C-45/CTBN and 411-C-45/A2 (or A4) Mixtures (a) Physical properties were determined on standard, replicate test specimens prepared from cured castings of mixtures of catalyst and the DERAKANE/flexibilizer combinations listed in Table II. The catalyst components and amounts in each mixture were as follows:

60% solution of methylethylketone peroxide in a phthalate, 1.5 wt. %; 6% solution of cobalt naphthenate in a phthalate, 0.3%; and dimethyl aniline, 0.1%. The cure schedule was 2 hours at 100° C. Test specimens were identically prepared, for comparison, from DERAKANES 411-C-45 and 411-45 as such, i.e., with no flexibilizers added.

As noted earlier herein, "CTBN" is a trade name registered to B. F. Goodrich Co. for carboxy-terminated, butadiene/acrylonitrile rubbers. XD-8084.03 is an experimental DERAKANE/CBTN blend containing about 50 wt. % styrene and XD-8084.04 is otherwise essentially the same but contains about 55% styrene.

TABLE II
COMPARISON OF CBTN AND HPA/TDI/P-2000 OLIGOMERS AS FLEXIBILIZERS FOR VINYL ESTER/STYRENE MIXTURES

| Mixture | Wt. Percent Sty.[1] | Wt. Percent Flex.[2] | Barcol Hardness | Percent Elongation | Tensile Strength psi | E.M.[3] × 10$^{-4}$ |
|---|---|---|---|---|---|---|
| 411-45 | 45 | 0 | 36 | 4 | 12,000 | 4.9 |
| 411-C-45 | 45 | 0 | 35 | 5 | 11,000 | 4.4 |
| XD-8084.03 | 50 | 7.5[4] | 29 | 9.6 | 9,600 | 4.2 |
| XD-8084.04 | 55 | 6.1[4] | 28 | 9.9 | 9,300 | 4.0 |
| 411-C-45/A4[5] | 46 | 13.0 | 33 | 8.0 | 10,500 | 3.9 |
| 411C45/A2[6] | 45 | 12.0 | 27 | 21.0 | 7,500 | 3.8 |
|  | 45 | 6.9 | 33 | 10.2 | 9,840 | 3.5 |

TABLE II-continued
COMPARISON OF CBTN AND HPA/TDI/P-2000 OLIGOMERS AS
FLEXIBILIZERS FOR VINYL ESTER/STYRENE MIXTURES

| Mixture | Wt. Percent Sty.[1] | Wt. Percent Flex.[2] | Barcol Hardness | Percent Elongation | Tensile Strength psi | E.M.[3] × $10^{-4}$ |
|---|---|---|---|---|---|---|
| | ~43 | 3.75 | 36 | 6.5 | 11,400 | 4.1 |

Notes:
[1]Styrene
[2]Flexibilizer
[3]Modulus of Elasticity
[4]CBTN rubber; not compatible with ester/styrene components.
[5]1.8(HPA)/2(TDI)/P-1200 Urethane Oligomer. Did not phase out in cured mixture.
[6]1.7(HPA)/2(TDI)/1.15(P-2000). Phased out at each concentration in cured mixture.

It will be seen that, even at 13 wt. % concentration, the non-phasing oligomer derived from P-1200 was less effective than CTBN at about 6–7.5% concentration. However, the oligomer (derived from P-2000) which was incompatible in the cured mixture, gave a very high elongation at 12%, was superior to CTBN at about the same concentration (6.9%) and was still quite effective at the low concentration of 3 75%.

(b) Specimens of the mixture in Table II were also compared (in the standard ASTM manner) as to toluene resistance. The results are given in Table III.

TABLE III

Effects of Immersion in Toluene
At Room Temperature and at 50° C.

| | Immersion at Room Temperature | | | | Barcol Hardness after Immersion for 1 hr @ 50° C., Then Time Out | | |
|---|---|---|---|---|---|---|---|
| | Barcol Hardness after: | | | % Wt. Gain | | | |
| Sample | 2 hrs | 1 day | 4 days | 4 hrs | 6 hrs | 1 day | 4 days |
| 411-45 | 35 | 36 | 35 | 0.2 | 34 | 34 | 34 |
| 411-C-45 | 34 | 31 | 28 | 0.8 | 27 | 31 | 31 |
| XD-8084.03 | 18 | 0 | Fragile | 9.2 | 0 | 0 | 0 |
| XD-8084.04 | 7 | 0 | Very Soft | 13.9 | 0 | 0 | Fell Apart |
| 411-C-45/A4 | 25 | 7 | 0 | 5.3 | 4 | 10 | 13 |
| 411-C-45/A2 | 28 | 23 | 17 | 2.6 | 14 | 20 | 21 |

See Notes after Table II.

It will be seen that the toluene resistance of both of the mixtures of 411-C-45 with type A flexibilizers was dramatically better than that of the mixtures with CTBN rubber, but only the mixture in which the flexibilizer (A2) was derived from P-2000 (rather than P-1200) showed retention of the resistance of 411-C-45 itself to a substantial extent.

EXAMPLE 4

Hardness and Elongation vs Mole Ratio of P-2000 to TDI in Type A, Oligomeric Flexibilizers 411-C-45/Type A flexibilizer mixtures containing 6.9 wt. % of the flexibilizers listed in Table IV were compared as to Barcol Hardness and percent elongation.

TABLE IV

| Flexibilizer | Ratios HPA/TDI/P-2000 | Barcol Hardness | % Elongation |
|---|---|---|---|
| A1 | 1.8/2/1 | 32 | 8.5 |
| A8 | 1.8/2/1.1 | 31 | 10.0 |
| A2[1] | 1.7/2/1.15 | 33 | 10.2 |
| A7 | 1.75/2/1.17 | 33 | 10.2 |
| A6 | 1.6/2/1.2 | — | 8.0 |

Note:
[1]Data from Table II.

It will be seen that TDI/P-2000 ratios of 2/1.15 to 2/1.17 (1.74 to 1.71) appear to be about optimal for type A flexibilizers in DERAKANE 411-C-45.

EXAMPLE 5

Content of A1 Flexibilizer in Mixtures with 411-C-50, versus Physical Properties The DERAKANE used was the same as 411-C-45 except that it had a styrene content of 50%. Again, samples of the DERAKANE itself (no flexibilizer) and of XD-8084.03 were tested for comparison. Also tested was a sample of XD-8084.05, which is derived from a somewhat lower EEW epoxy resin and contains more of the CTBN and less styrene. The results are given in Table V, following.

TABLE V

| Mixture | Tensile Strength psi | Tensile Elongation % | Flexural Strength psi | Flexural Modulus psi ($\times 10^{-5}$) | Notched Izod[4] ft lbs/ Inch | Kinematic Viscosity[1] 77° F. cps | HDT[2] °F. 264 psi | Tg[3] (DuPont) (990 TMA) °F. | Barcol hardness | Cured Casting Appearance | Uncured Liquid Appearance |
|---|---|---|---|---|---|---|---|---|---|---|---|
| DERA-KANE* 411-C-50 (Typical) | 11,000 | 4% | 21,000 | .520 | 0.25 | 100 | 207 | 199 (1 value) | 39 | Clear | Clear |
| XD-8084.03 (Typical) | 10,000 | 5–8 | 17,000 | .488 | 0.4 | 1040 | 169 | — | 30 | Clear | Clear |
| XD-8084.05 | 9,670 | 7.2 | 17,500 | .455 | — | 349 | 189 | — | 33 | Clear | Clear |
| DERAKANE 411-C-50 with 5.0% A1 | 10,030± 120 | 8.2 ± 1.2 | 17,610 ± 200 | .451 ± .012 | 0.52 ± .14 | 173 | 189 | — | 30.6 ± 1.8 | Slightly Translucent | Translucent |
| DERAKANE 411-C-50 with 7.5% A1 | 8,400 ± 100 | 12.4 ± 3.4 | 15,610 ± 340 | .415 ± .011 | 0.63 ± .15 | 211 | 181 | — | 27.4± 1.7 | Translucent | Translucent |
| DERAKANE 411-C-50 with 10% A1 | 8,070 | 12% | 14,700 | .418 | 0.72 | 323 | 156 | 170 | 30 | Translucent | Clear |

TABLE V-continued

| Mixture | Tensile Strength psi | Tensile Elongation % | Flexural Strength psi | Flexural Modulus psi ($\times 10^{-5}$) | Notched Izod[4] ft lbs/ Inch | Kinematic Viscosity[1] 77° F. cps | HDT[2] °F. 264 psi | Tg[3] (DuPont) (990 TMA) °F. | Barcol hardness | Cured Casting Appearance | Uncured Liquid Appearance |
|---|---|---|---|---|---|---|---|---|---|---|---|
| DERAKANE 411-C-50 with 20% A1 | 4,320 ± 80 | 32% ± 5 | 7,660 ± 210 | .215 ± .005 | 0.69 | 585 | 140 | — | 5 | Almost Opaque | Clear |

NOTES:
[1] Of uncured, liquid mixture.
[2] Heat Distortion Temperature.
[3] Glass Transition Temperature.
[4] Impact strength.
*Trademark of The Dow Chemical Company It will be seen that A1 was a generally more effective flexibilizer than CTBN, even at substantially lower concentrations (5 wt. % vs 6–7% (Table II)). It will also be seen that substantial retention of other properties is achieved at A1 concentrations which are high enough to give dramatically higher elongations and impact strengths.

EXAMPLE 6

Flexibilization of DERAKANE 411-C-50 with Flexibilizer B2

Castings ⅛" thick were prepared from 411-C-50 as such and from a mixture thereof with B2 containing 8.2 wt. % of the flexibilizer. Both materials were cured with benzoyl peroxide at 90° C. The castings were cut into strips ¾" wide and long enough to leave a 3" length protruding free when clamped at one end in a vise. The 3" portions were bent to an arcuate shape in a manner such that the bend was distributed over their entire, unclamped lengths and the angle of bend measured between straight lines through the initial and final positions of their free tips. The strips containing no B2 broke before being bent to an angle of 50°, whereas the flexibilized strips could be bent to an angle of more than 150° without breaking; i.e., flexibilizer B2 was very effective at an 8.2% concentration.

EXAMPLE 7

Flexibilization of "methacrylated Trisepoxy"/styrene with Flexibilizers A1 and A3

U.S. Pat. No. 4,394,496 (filed Oct. 30, 1981) discloses (and claims) a family of monomeric and oligomeric reaction products of epihalohydrins and 1,1,1-tri(hydroxyphenyl)alkanes in which the alkane moiety contains from 1 to 11 carbons. These products are polyglycidyl ethers having outstanding resistance to heat and moisture. U.S. Pat. No. 4,338,242 is directed to vinyl-terminated, polyfunctional urethanes and discloses, as an intermediate for the preparation of a specific such urethane, an adduct of 3 moles of methacrylic acid with one mole of tris(4-glycidyloxyphenyl)methane. Preparation of the latter vinyl ester ("methacrylated tris") as a solution in styrene is also disclosed in the patent. Such solutions are highly preferred, curable, vinyl ester non-resinous monomer compositions to which flexibilizers may be added according to the present invention.

Accordingly, cured castings were prepared from methacrylated tris/styrene solutions containing from zero to about 10 wt. % of flexibilizers A1 and A3. Each solution was mixed with 0.1 wt. % of benzoyl peroxide (Witco; 40% solution in benzoquinone), poured into a 6"×½"×¼" mold cavity and cured 5 hours at 150° C. The Barcol hardness of each of the cured strips was determined and they were then tested in flexure in the manner of the preceding example (No. 6). The results are given in Table VI, following.

TABLE VI

| Formulation | % Styrene | % Flexibilizer | Appearance Before Curing | Appearance When Cured | Barcol Hardness | Maximum Angle of Deflection Without Breaking |
|---|---|---|---|---|---|---|
| MT[1] S[2] [3] | 50.0 | 0 | Clear | Clear | 20 | 5.6° |
| MT/S/A1 | 47.6 | 4.76 | Clear | Slightly Opaque | 10 | 11.0° |
| MT/S/A1 | 45.5 | 9.09 | Clear | Nearer to Opaque | 5 | 3.2° |
| MT/S/A3 | 47.1 | 5.8 | Hazy | Opaque | 6 | 11.0° |
| MT/S/A3 | 44.5 | 11.0 | Hazy | Opaque | | |

NOTES:
[1] MT Methacrylated tris.
[2] S Styrene.
[3] Control.

It will be seen that both flexibilizers were quite effective when present in amounts of about 5–6 wt. % but actually decreased the resistance to flexure (vis a vis the control) at concentrations of about 9–11 wt. %. This clearly demonstrates the sensitivity of flexibilizing action to variables such as the flexibilizer to base resin ratio.

What is claimed is:

1. A curable shaped article which is not in the form of a coating, and is formed from a material consisting essentially of a homogeneous mixture of a vinyl ester with a toughness imparting urethane oligomer and a non-resinous vinyl monomer, the urethane to ester ratio by weight in said mixture being from about 3/97 to about 40/60, the weight percent of said monomer therein being from about 10 to about 60, the weight percent of said urethane therein being from about 3 to about 20 and said urethane being one which:
    a. is the reaction product of one molecular proportion of a polyalkylene glycol, having a molecular weight of from about 1,200 to about 4,000 with either (1) about 0.5 molecular proportion of a diisocyanate and about 1 molecular proportion of a vinyl-reactive monoisocyanate or monoisothiocyanate or (2) from about 1.5 to 2 molecular proportions of a diisocyanate and from about 1 to about 2 molecular proportions of a hydroxyalkyl acrylate or methacrylate, an alkylene oxide extended hydroxyalkyl acrylate, an N-methylol acrylamide or an alkyl- or vinyldialkanolmine b. will form a dispersed second phase when said article is cured; and c. has weight average molecular weight of from about 4,000 to about 8,000.

2. The article as in claim 1 wherein the content of said monomer is from about 40 to about 55 wt. %.

3. The article of claim 2 in which said mixture contains from about 3 to about 16 wt. % of said urethane.

4. The article as in claim 3 wherein said mixture contains from about 4 to about 11 wt. % of said urethane.

5. The article as in claim 3 wherein said mixture contains from about 5 to about 10 wt. % of said urethane.

6. The article of claim 1 in which said urethane is a reaction product of 1 molecular proportions of a polyalkylene glycol with from about 1.5 to 2 molecular proportions of a diisocyanate and 2 molecule proportions of a hydroxyalkylacrylate or methacrylate, an alkylene oxide extended hydroxy-acrylate, N-methylol acrylamide, or an allyl- or vinyldialkanolamine.

7. The article of claim 6 in which said diisocyanate is an aromatic diisocyanate.

8. The article of claim 1 in which said urethane is a reaction product of about 1 molecular proportion of a polyalkylene glycol with about 0.5 molecular proportions of a diisocyanate and 1 molecular proportion of a vinyl-reactive isocyanate.

9. The article of claim 6 in which said polyalkylene glycol is a polypropylene glycol, said diisocyanate is a mixture of isomeric toluene diisocyanates and said acrylate is 2-hydroxypropyl or 2-hydroxyethyl acrylate.

10. The article of claim 8 in which said polyalkylene glycol is a polypropylene glycol and said vinyl-reactive isocyanate is 2-isocyanatoethyl methacrylate.

11. The article of claim 8 in which said polyalkylene glycol is a polypropylene glycol, said diisocyanate is a mixture of isomers of toluene diisocyanate and said vinyl reactive isocyanate is 2-isocyanatoethyl methacrylate.

12. The article of claim 9 in which said polypropylene glycol has a molecule weight of from about 2000 to about 4000.

13. The article of claim 10 in which said polypropylene glycol has a molecular weight of about 2000.

14. The article of claim 11 in which said polypropylene glycol has a molecular weight of about 2000.

15. The article of claim 12 in which said urethane is the reaction product of 1 molecular proportion of a polypropylene glycol having a molecular weight of about 2000, about 2 molecular proportions of an about 80/20 mixture of the 2,4- and 2,6- isomers of toluene diisocyanate and about two molecular proportions of 2-hydroxypropyl or 2-hydroxyethyl acrylate.

16. The article of claim 15 wherein said acrylate is 2-hydroxypropyl acrylate and said urethane has a weight average molecular weight of from about 5000 to about 8000.

17. The article of claim 1 in which said vinyl ester has been made by reaction with each other of: (1) a monomeric or oligomeric reaction product of an epihalohydrin with a 1,1,1-tri(hydroxyphenyl)alkane in which the alkane moiety contains from 1 to 11 carbons; and (2) a vinyl-reactive, unsaturated monocarboxylic acid.

18. The article of claim 17 in which said urethane is a reaction product of one molecular proportion of a polypropylene glycol, about two molecular proportions of an aromatic diisocyanate and about two molecular proportions of a hydroxyalkylacrylate or -methacrylate.

19. The article of claim 18 in which said polypropylene glycol has a molecular weight of about 2000, said diisocyanate is an about 80/20 mixture of the 2,4- and 2,6- isomers of toluene diisocyanate, said acrylate is 2-hydroxypropyl or 2-hydroxyethyl acrylate or methacrylate and said urethane has a weight average molecular weight of from about 5000 to about 8000.

20. A method of producing a toughened, rigid article from a curable material consisting essentially of a homogeneous mixture of a vinyl ester with a vinyl-reactive urethane oligomer and a non-resinous vinyl monomer, said method comprising shaping a mass of said material in the form of said article, said form being other than that of a coating, and curing the shaped mass, the urethane to ester ratio by weight in said mixture being from about 3/97 to bout 40/60, the weight percent of said monomer therein being from about 10 to about 60, the weight percent of said urethane therein being from about 3 to about 20 and said urethane being one which:

a. is the reaction product of one molecular proportion of a polyalkylene glycol, having a molecular weight of from about 1,200 to about 4,000, with either (1) about 0.5 molecular proportion of a diisocyanate and about 1 of a vinyl-reactive monoisocyanate or (2) from about 1.5 to about 2 molecular proportions of a diisocyanate and from about 1 to about 2 molecular proportions of a hydroxyalkyl acrylate or methacrylate, an alkylene oxide extended hydroxyalkyl acrylate, an N-methylol acrylamide or an alkyl- or vinyldialkanolamine b. forms a dispersed second phase when said article is cured; and c. has a weight average molecular weight of from about 4,000 to about 8,000.

21. The method of claim 20 wherein said urethane is the reaction product of one molecular proportion of a polypropylene glycol having a molecular weight of about 2,000, about two molecular proportions of an about 80/20 mixture of 2,4- and 2,6-isomers of toluene diisocyanate and about two molecular proportions of 2-hydroxypropyl or 2-hydroxyethyl acrylate and has a weight average molecular weight of from about 5,000 to about 8,000.

22. The method of claim 20 in which said vinyl ester has been made by the reaction with each other of (1) a monomeric or oligomeric reaction product of an epihalohydrin with a 1,1,1-tri(hydroxyphenyl)alkane in which the alkane moiety contains from 1 to 11 carbons; and (2) a vinyl-reactive, unsaturated carboxylic acid.

23. The method of claim 22 in which said urethane is the reaction product of one molecular proportion of polypropylene glycol having a molecular weight of about 2000, about 1.5 to 2 molecular proportions of an about 80/20 mixture of the 2,4- and 2,6- isomers of toluene diisocyanate and about two molecular proportions of 2-hydroxypropyl or 2-hydroxy ethyl acrylate or methacrylate and has a weight average molecular weight of from about 5000 to about 8000.

24. The method of claim 23 product of one molecular proportion of polypropylene glycol having a molecular weight of about propylene glycol having a molecular weight of about 2000, from about 1.7 to 2 molecular proportions of an about 80/20 mixture of the 2,4- and 2,6- isomers of toluene diisocyanate and about two molecular proportions of 2-hydroxypropyl or 2-hydroxyethyl acrylate or methacrylate and the resultant shaped mass is cured.

25. The method of claim 20 in which said urethane is a reaction product of 1 molecular proportion of a polyalkylene glycol with about 0.5 molecular proportion of a diisocyanate and about 2 molecular proportions of a vinyl-reactive monoisocyanate or monoisothiocyanate and the resultant shaped mass is cured.

26. The method of claim 25 in which said polyalkylene glycol is a polypropylene glycol and said vinyl-reactive isocyanate or isothiocyanate is 2-isocyanatomethacrylate.

27. The method of claim 26 in which said polypropylene glycol has a molecular weight of about 2000.

28. The article of claim 1, cured.

* * * * *

UNITED STATES PATENT AND TRADEMARK OFFICE
CERTIFICATE OF CORRECTION

PATENT NO. : 4,824,919
DATED : April 25, 1989
INVENTOR(S) : Alvin W. Baker et al.

It is certified that error appears in the above-identified patent and that said Letters Patent is hereby corrected as shown below:

Col. 1, line 9, delete " This application is a continuation of application/Ser. No. 682,633, filed Dec. 17, 1984, now abandoned, which is a continuation-in-part of application/Ser. No. 502,886, filed June 9, 1983, now abandoned." and insert -- This application is a continuation of a copending application, Ser. No. 682,633, filed Dec. 17, 1984, which is a continuation-in-part of a then co-pending application, Ser. No. 502,886, filed June 9, 1983 and now abandoned.

Col. 14, in the heading of Table II, delete "COMPARISON OF CBTN", and insert -- COMPARISON OF CTBN --;

Col. 15, in Table II, continued, in the heading, delete "COMPARISON OF CBTN", and insert -- COMPARISON OF CTBN --;

Col. 15, in Table II, continued, in the subheading "Notes:", for Note 4, delete "CBTN" and insert -- CTBN --;

Col. 15, line 22, delete "3 75%" and insert -- 3.75% --;

UNITED STATES PATENT AND TRADEMARK OFFICE
CERTIFICATE OF CORRECTION

PATENT NO. : 4,824,919

DATED : April 25, 1989

INVENTOR(S) : Alvin W. Baker et al.

It is certified that error appears in the above-identified patent and that said Letters Patent is hereby corrected as shown below:

Col. 18, in Table VI, under the subheading "Barcol Hardness' for the second reference to the formulation "MT/S/A3" insert -- 5 --;

Col. 18, in Table VI, under the subheading " Maximum Angle of Deflection without Breaking", for the second reference to the formulation "MT/S/A3" insert -- 3° --;

Col. 20, line 35, after "about 1" insert -- molecular proportion --;

Col. 21, line 4, after "claim 23", insert -- in which said urethane is the reaction --.

Signed and Sealed this

Twenty-third Day of June, 1992

Attest:

DOUGLAS B. COMER

Attesting Officer

Acting Commissioner of Patents and Trademarks